Feb. 8, 1927.
W. AMES
CALIPER GAUGE
Filed Jan. 13, 1926
1,617,284
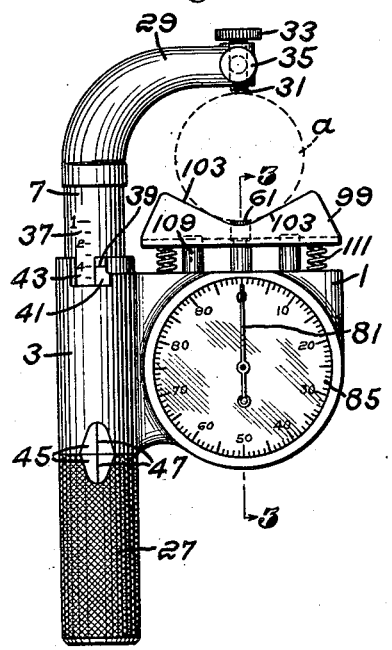
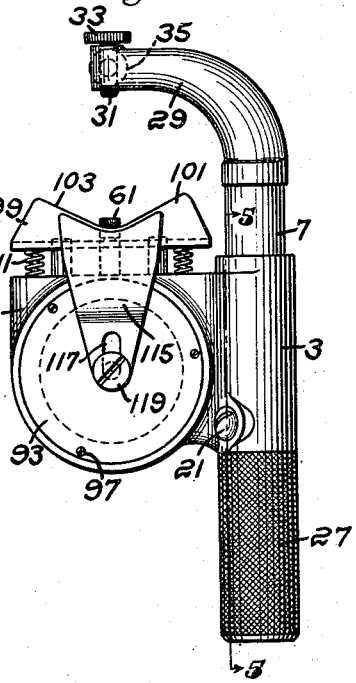
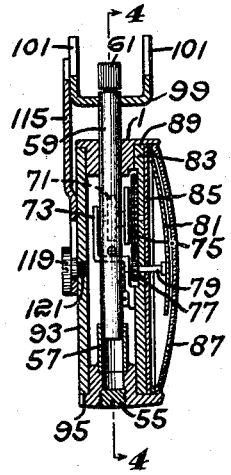
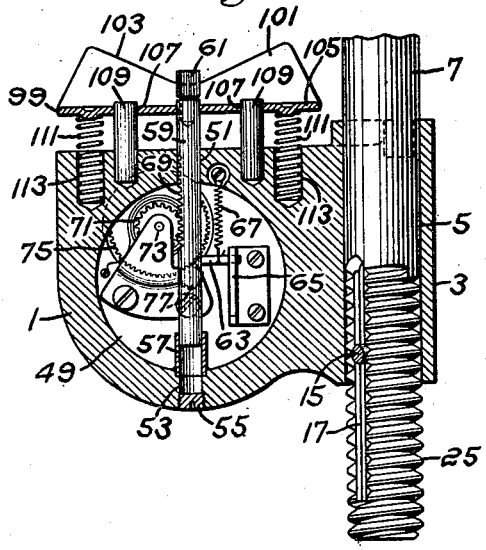
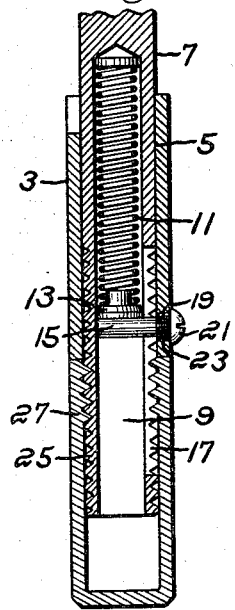
Inventor:
Warren Ames,
by Emery Booth Janney & Varney
Attys.

Patented Feb. 8, 1927.

1,617,284

UNITED STATES PATENT OFFICE.

WARREN AMES, OF WALTHAM, MASSACHUSETTS, ASSIGNOR TO B. C. AMES CO., OF WALTHAM, MASSACHUSETTS, A CORPORATION OF MASSACHUSETTS.

CALIPER GAUGE.

Application filed January 13, 1926. Serial No. 80,962.

My invention relates to gauges, and particularly to one for measuring and testing outside diameters of cylindrical surfaces such as crank shafts.

My invention will be best understood from the following description when read in the light of the accompanying drawing of an illustrative embodiment of my invention, while the scope of my invention will be more particularly pointed out in the appended claims.

In the drawings:—

Fig. 1 shows a side elevation on a reduced scale of a gauge constructed according to my invention;

Fig. 2 is a back view of the gauge;

Fig. 3 is a section on the line 3—3 of Fig. 1;

Fig. 4 is a section on the line 4—4 of Fig. 3 with parts broken away and parts omitted; and Fig. 5 is a section on the line 5—5 of Fig. 2.

Referring to the drawings I have shown an indicator comprising the casing or support 1 having an integral sleeve portion 3 through the cylindrical bore 5 of which extends a relatively movable stem 7. As indicated in Fig. 5 the lower end portion of the stem is provided with a bore 9 which receives the coiled compression spring 11, the latter at its lower end having an associated button 13 which rests upon a pin 15 carried by the sleeve 3. As shown the stem 7 has a longitudinal slot 17 through which the pin 15 extends, the pin having a screw threaded portion 19 and a screw head 21, the screw threaded portion 19 being received in a screw threaded perforation 23 in the wall of the sleeve 3. The lower end of the stem 7 is screw threaded as is indicated at 25, and on this screw threaded portion is placed a knurled adjusting cap 27 the upper end of which bears against the lower end of the sleeve 3.

It will be observed from the above described construction that the pin 15 which cooperates with the walls of the slots 17 in the stem 7 prevents rotation of the stem in the indicator casing, also that the pin serves as an abutment for the compression spring 11, the latter acting to urge the stem 7 upwardly relative to the indicator support so that the position of the stem relative to the indicator may be adjusted by turning the cap 27. Preferably the cap 27 is of sufficient length to serve as a handle for the gauge.

At its upper end the stem 7 has a fixed laterally projecting portion 29 which carries a contact member 31, the latter being in the form of a screw extending through a screw threaded perforation at the end portion 29 and being provided with a head 33 turning of which will adjust the contact member relative to the portion 29. For preventing unintentional turning of the contact member I have provided a set screw 35 carried by the portion 29 of the stem, said screw being adapted to be screwed tightly against the screw threaded portion of the contact member 31 received by said portion 29.

For a purpose hereinafter described the body of the stem is provided with graduations 37 which cooperate with a mark 39 on the bevelled side wall 41 of the notch 43 at the upper end of the sleeve portion 3 of the indicator support, while the lower end of the sleeve 3 and upper end of the cap 27 are flattened as indicated at 45 in Fig. 1 and are provided with marks 47 which when in alignment indicate that one of the graduations 37 is in alignment with the mark 39. Conveniently the graduations 37 may be spaced one-tenth of an inch apart, in which case the pitch of the screw threads 25 will be one-tenth of an inch so that one revolution of the cap 27 will move the stem relative to the indicator casing one-tenth of an inch.

Referring particularly to Figs. 3 and 4, the indicator casing or support is provided with a chamber 49 at diametrically opposite sides of which are upper and lower perforations 51 and 53, the latter being closed by a screw threaded plug 55. Slidingly supported in the upper perforation 51 and in a sleeve 57 carried by the lower perforation is a rod 59 in alignment with the upper contact member 31. The rod 59 with its detachable contact point 61 constitutes the lower contact member of the gauge. Herein the rod 59 carries a projecting pin 63 cooperating with a guide member 65 for preventing turning of the rod, and attached to the pin is a tension spring 67 secured at one end to the casing so as to urge the rod to move outwardly relative to the casing. As illustrated the rod 59 is provided with rack teeth 69 which engage with a pinion 71 carried by a spindle 73. Fixed on the spindle is a split gear 75 with which meshes a center pinion 77, the latter being mounted on a spindle 79 carrying the indicator pointer 81. Closing the front of the chamber 49 is a top plate 83 which carries the dial 85 of the indicator. Conveniently the indicator above the dial has a lens 87. As shown the top plate, dial, and lens are received in the enlarged internal bore 89 of the indicator casing and are secured in position by snapping the lens into the recess formed by the bore. The gear ratio of the indicator conveniently may be such that one-tenth of an inch movement of the rod 59 causes one revolution of the pointer 81, in which case the dial conveniently may be divided into one hundred parts, each representing one-thousandth of an inch movement of the rod 59. The back plate 93 of the indicator is set into a recess 95 (Fig. 3) and is held in position by means of screws 97 (Fig. 2).

For placing the contact members 31 and 61 on the diameter of cylindrical work I have herein provided a "V-block" 99 which herein is in the form of a hardened steel piece generally U-shaped in cross-section as clearly shown by Fig. 3. The upper edges of the side walls 101 of the V-block are notched to provide diverging edges 103 which intersect each other along a line normal to the line including the axes of the contact members 31 and 61. The bottom wall 105 of the V-block is perforated at 107 to receive pins 109 rigidly carried by the indicator casing. The perforations 107 have a sliding fit on the pins 109, and consequently the pins act as a guide permitting reciprocation of the V-block relative to the indicator casing while maintaining the V-block in proper relation to the contact members. I have herein shown compression springs 111 each having an end set into a recess 113 at the upper side of the indicator casing, while the opposite ends abut with the bottom of the V-block so as constantly to urge the V-block away from the indicator casing toward the work.

For retaining the V-block 99 in assembled relation with the gauge I have herein provided a plate 115 the upper end of which is secured to the V-block, as for example by welding, while the lower end is provided with a slot 117 through which extends a screw threaded into a perforation 121 in the back plate 93.

It will be observed that I have provided a gauge comprising a pair of relatively movable indicator members, and a work engaging member for placing the contact members at diametrically opposite points on the work, the work engaging member engaging the work along spaced parallel lines on the surface of the work. Further the work engaging member and one of the contact members are independently yieldingly urged toward the work, while the other contact member is manually adustable relative to the work and to the first mentioned contact member.

As an example of uses of the gauge, but without limitation thereto, the roundness of a crank pin may be tested by placing the gauge on the crank pin as indicated in Fig. 1 wherein the crank pin is indicated by dotted lines at a. The cap 27 may then be rotated to move the indicator toward the crank pin until the pointer stands at zero on the dial. The gauge may then be rotated about the crank pin, and deflections of the indicator hand from the zero point will indicate the presence of out-of-roundness and the extent thereof. It will be observed that in rotating the gauge the V-block at all times maintains the two contact members at opposite ends of the diameters of the work.

In using the gauge for measuring diameters a set gauge, internal micrometer gauge, plug gauge or other similar device may be used to set the contact members at a known distance apart. For example, a plug gauge, say one inch in diameter, may be placed between the contact points and the cap 27 rotated until the mark 39 coincides with the mark "1" of the graduations on the stem 7 and the two marks 47 coincide, after which the contact member 31 may be adjusted by rotating the same to bring the indicator hand 81 on the zero mark. Conveniently the marks 37 are so positioned on the stem that the mark 39 will register with the mark "1" simultaneously with coincidence of the two marks 47 after the indicator hand has made one complete revolution. This permits the indicator hand to measure wide variation in the unknown diameters of the work to which the gauge is subsequently applied after setting it to the standard as described. After removal of the standard the gauge may be applied to the work to be measured in which case the graduations 37 will indicate diameters of 1.10, 1.20, 1.30, etc. inches, while the indicator hand will indicate thousandths of an inch. In applying the gauge to the work to be measured the cap 27 is turned with contacts 31 and 61 on the work until the indicator hand makes at least one complete revolution and the marks 47 are brought into coincidence. If under these conditions the mark 39 coincides for example with "4" of the graduations 37 and the indicator hand for example coincides with 27 on the dial, the diameter measured will be 1.427 inches.

In truing up a worn crank pin, for example, the gauge may be used to measure the amount of out-of-roundness by the operation above described, which indicates to the mechanic whether or not the crank pin needs to be trued. The operator is then in a position to determine the nearest size of "undersized" connecting rod bushing, and in turning or grinding the work to true it he can apply the gauge from time to time to determine the progress of the operation so that he will know when the crank pin has been reduced to the desired diameter.

Although I have described one illustrative embodiment of my invention it will be understood that within the scope of my invention wide deviations may be made therefrom without departing from the spirit of my invention.

Claims:

1. A device for gauging outside cylindrical work having, in combination, indicating means comprising a relatively movable indicating dial and pointer and a movable contact member, mechanism actuated by said member for effecting the relative movement between said dial and pointer, a second contact member opposed to the first mentioned contact member, contact-positioning-means for engaging the work at points along spaced parallel lines for stably positioning said contact members diametrically of the work positioned between said contact members, means effective yieldingly to urge said first mentioned contact member and said contact-positioning-means independently toward the work positioned between said contact members, and supporting means carrying the enumerated parts of the device in operative relation.

2. A device for gauging outside cylindrical work having, in combination, a relatively movable indicating scale and pointer, a pair of opposed contact members between which the work is to be positioned, means actuated by one of said contact members for effecting relative movement between said scale and pointer, this contact member being yieldingly urged toward the work so positioned, the other of said contact members being adjustable relative to the first contact member, contact-positioning-means yieldingly urged toward the work so positioned for engagement therewith for positioning said contact members diametrically of said work, and supporting means carrying the enumerated parts of the device in operative relation.

3. A device for gauging outside cylindrical work having, in combination, a relatively movable indicating scale and pointer, a pair of opposed contact members between which the work is to be positioned, means actuated by one of said contact members for effecting relative movement between said scale and pointer, this contact member being yieldingly urged toward the work so positioned, the other of said contact members being adjustable relative to the first contact member, contact-positioning-means yieldingly urged toward the work so positioned for engagement therewith at points along spaced parallel lines for positioning said contact members diametrically of said work, and supporting means carrying the enumerated parts of the device in operative relation.

4. A device for gauging outside cylindrical work having, in combination, a relatively movable indicating scale and pointer, a pair of opposed contact members, means actuated by one of said contact members for effecting relative movement between said scale and pointer, said member being yieldingly urged toward the work positioned between said contact members, the other of said contact members being adjustable relatively to the first contact member, a V-block yieldingly urged toward the work positioned between said contact members for engagement therewith for positioning said contact members diametrically of the work and supporting means carrying the enumerated parts of the device in operative relation.

5. A device for gauging outside cylindrical work having, in combination, a relatively movable indicating dial and pointer, a pair of opposed contact members between which the work is to be positioned, one of said contact members being movable, means responsive to movement of the movable contact member for actuating relative movement between said dial and pointer, means yieldingly urging said movable contact member toward the work so positioned, contact-positioning-means for engaging the work so positioned for positioning said contact members diametrically of said work, means yieldingly urging said contact-positioning-means toward said work, and supporting means carrying the enumerated parts of the device in operative relation.

6. A device for gauging outside cylindrical work having, in combination, a relatively movable indicating dial and pointer, a pair of opposed contact members between which the work is to be positioned, one of said contact members being movable, means responsive to movement of the movable contact member for actuating relative movement between said dial and pointer, means yieldingly urging said movable contact member toward the work so positioned, contact-positioning-means for engaging the work so positioned at points along spaced parallel lines for positioning said contact members diametrically of said work, means yieldingly urging said contact-positioning-means toward said work, and supporting means carrying the enumerated parts of the device in operative relation.

7. A device for gauging outside cylindrical work having, in combination, a relatively movable indicating dial and pointer, a pair of opposed contact members between which the work is to be positioned, one of said contact members being movable, means responsive to movement of the movable contact member for actuating relative movement between said dial and pointer, means yieldingly urging said movable contact member toward the work so positioned, a V-block for engaging the work so positioned for positioning said contact members diametrically of said work, means yieldingly urging said V-block toward said work, and supporting means carrying the enumerated parts of the device in operative relation.

8. A device for gauging outside cylindrical work having, in combination, a relatively movable indicating dial and pointer, a pair of opposed contact members between which the work is to be positioned, one of said contact members being movable and the other being adjustable relative to the first, means responsive to movement of the movable contact member for actuating relative movement between said dial and pointer, means yieldingly urging said movable contact member toward the work so positioned, contact positioning-means for engaging the work so positioned for positioning said contact members diametrically of said work, means yieldingly urging said contact-positioning-means toward said work, and supporting means carrying the enumerated parts of the device in operative relation.

9. A device for gauging outside cylindrical work having, in combination, a relatively movable indicating dial and pointer, a pair of opposed contact members between which the work is to be positioned, one of said contact members being movable and the other being adjustable relative to the first, means responsive to movement of the movable contact member for actuating relative movement between said dial and pointer, means yieldingly urging said movable contact member toward the work so positioned, contact-positioning-means for engaging the work so positioned at points along spaced parallel lines for positioning said contact members diametrically of said work, means yieldingly urging said contact-positioning-means toward said work, and supporting means carrying the enumerated parts of the device in operative relation.

10. A device for gauging outside cylindrical work having, in combination, a relatively movable indicating dial and pointer, a pair of opposed contact members between which the work is to be positioned, one of said contact members being movable and the other being adjustable relative to the first, means responsive to movement of the movable contact member for actuating relative movement between said dial and pointer, means yieldingly urging said movable contact member toward the work so positioned, a V-block for engaging the work so positioned for positioning said contact members diametrically of said work, means yieldingly urging said V-block toward said work, and supporting means carrying the enumerated parts of the device in operative relation.

11. A device for gauging outside cylindrical work having, in combination, a relatively movable indicating dial and pointer, a pair of aligned contact members between which the work is to be positioned, one of said contact members being elongated and axially movable, means operated by the movable contact member for actuating relative movement between said dial and pointer, means yieldingly urging said movable contact member toward the work so positioned, contact-positioning-means for engaging the work so positioned at points along spaced parallel lines for positioning said contact members diametrically of said work, means yieldingly urging said contact-positioning-means toward said work, and supporting means carrying the enumerated parts of the device in operative relation.

12. A device for gauging outside cylindrical work having, in combination, a relatively movable indicating dial and pointer, a pair of aligned contact members between which the work is to be positioned, one of said contact members being axially movable and the other being manually adjustable relative to the first, means operated by the movable contact member for actuating relative movement between said dial and pointer, means yieldingly urging said movable contact member toward the work so positioned, contact-positioning-means for engaging the work so positioned at points along spaced parallel lines for positioning said contact members diametrically of said work, means yieldingly urging said contact-positioning-means toward said work, and supporting means carrying the enumerated parts of the device in operative relation.

13. A device for gauging outside cylindrical work having, in combination, a relatively movable indicating dial and pointer, an axially movable contact member, a part adjustable relative to said contact member, a second contact member carried by said part, said second contact member being adjustable relative to said part and being in alignment with said first contact member in all relative positions of said contact members, means operated by said movable contact member for actuating relative movement between said dial and pointer, means yieldingly urging said movable contact member toward work positioned between said contact members, contact-positioning-means for engaging the work so positioned at points along spaced parallel lines for positioning said contact members diametrically of said work, means yieldingly urging said contact-positioning-means toward said work, and supporting means carrying the enumerated parts of the device in operative relation.

14. A device for gauging outside cylindrical work having, in combination, a support carrying indicating mechanism comprising a movable contact member, a part carried by said support and being adjustable relatively to said support, a second contact member carried by said part, said contact members being in alignment in all relative positions of the two, a V-block movably carried by said support, guiding means for said V-block for maintaining the work engaging ends of said contact members in a plane bisecting the angle of said V-block, and means carried by said support for yieldingly urging said first mentioned contact member and said V-block independently toward the work.

15. A device for gauging outside cylindrical work having, in combination, a support carrying indicating mechanism comprising a movable contact member, a part carried by said support and being adjustable relatively to said support, a second contact member carried by said part, said second contact member being adjustably carried by said part for movement toward and away from the first contact member, said contact members being in alignment in all relative positions of the two, a V-block movably carried by said support, guiding means for said V-block for maintaining the work engaging ends of said contact members in a plane bisecting the angle of said V-block, and means carried by said support for yieldingly urging said first mentioned contact member and said V-block independently toward the work.

16. In a device for gauging outside cylindrical work, a contact member, an indicator adjustable toward and away from said contact member; said indicator having a movable contact member aligned with said first mentioned contact member, and having a relatively movable dial and pointer, and means actuated by said movable contact member for effecting such relative movement, contact-positioning-means for engaging work positioned between said contact members at points along spaced parallel lines on said work, means for yieldingly urging said contact-positioning-means toward the work so positioned, means for yieldingly urging said movable contact member toward the work so positioned, the work-engaging-ends of said contact members being in a plane normal to and bisecting a plane including said parallel lines, and a support carrying the enumerated parts of the device in operative relation.

17. A device for gauging outside cylindrical work having, in combination, an indicator support, an indicator carried by said support and having a movable actuating contact member, a stem slidably carried by said support in non-rotatable relation thereto, said stem carrying a part offset toward said actuating contact member, said part carrying a contact member aligned with said actuating contact member, means for yieldingly urging said actuating contact member toward work positioned between said contact members, means yieldingly urging sliding movement of said stem in one direction, a stop member having a screw threaded adjustment lengthwise of said stem for determining the position of said stem relative to said support, and means for stably positioning said contact members diametrically of the work positioned between them.

18. A device for gauging outside cylindrical work having, in combination, an indicator support, an indicator having a movable actuating contact member, a stem slidably carried by said support in non-rotatable relation thereto, said stem carrying a part offset toward said actuating contact member, said part carrying a relatively adjustable contact member aligned with said actuating contact member, means for yieldingly urging said actuating contact member toward work positioned between said contact members, means yieldingly urging sliding movement of said stem in one direction, a stop member having a screw threaded adjustment lengthwise of said stem for determining the position of said stem relative to said support, and means for stably positioning said contact members diametrically of the work positioned between them.

19. A device for gauging outside cylindrical work having, in combination, an indicator comprising a movable work-engaging contact member for actuation of said indicator, work-engaging means yieldingly urged relative to said indicator toward the work engaged by said member for stably positioning said member diametrically of the work when said work-engaging means is presented thereto, work-engaging means effective while said first mentioned work-engaging means is presented to the work for adjusting said indicator toward or away from said work, and means carrying the enumerated parts of the device in operative relation.

20. A device for gauging outside cylindrical work having, in combination, a pair of opposed members to be positioned at opposite sides of the work, means for adjusting said members toward and away from each other, one of said members carrying an indicator having a work-engaging contact member for actuation of said indicator, one of said members having work-engaging means yieldingly urged relative to said indicator toward the work between said members for stably positioning said contact member diametrically of the work, and a support carrying the enumerated parts of the device in operative relation.

21. A device for gauging outside cylindrical work having, in combination, an indicator having a movable actuating contact member, the latter for engagement with the work, work-engaging means for automatically stably positioning said contact member diametrically of work of various diameters when said work-engaging means is presented thereto, means effective yieldingly to urge said contact member toward the work to which said work-engaging means is presented, other means effective yieldingly to urge relative movement between said indicator and work-engaging means for causing the latter stably to engage the work, and a support carrying the enumerated parts of the device in operative relation.

22. A device for gauging outside cylindrical work comprising, in combination, an indicator having a relatively movable dial and pointer, means comprising a movable contact member for actuating relative movement between said dial and pointer, said contact member having a range of movement capable of causing relative rotation between said dial and pointer of more than 360 degrees, a contact member aligned with said movable contact member, cooperating screw-and-nut means for adjusting said contact members relative to each other, a scale and pointer for indicating the adjusted positions of said contact members, the graduations of said scale being so positioned relative to said pointer for said scale and so numbered as to indicate the distance between the work engaging ends of contact members when said pointer for said indicator and dial have been relatively rotated from their initial position at least 360 degrees by relative adjustment of said contact members and said pointer for said indicator coincides with zero on said dial, and a support carrying the enumerated parts of the device in operative relation.

23. A device for gauging outside cylindrical work comprising, in combination, an indicator having a movable actuating contact member, a contact member aligned with said movable contact member, cooperating screw-and-nut means for adjusting said contact members relative to each other, a scale and pointer for measuring the adjusted position of said contact members, the pointer for said scale coinciding with the graduations of said scale when said indicator has a known reading caused by movement of said actuating contact member through a substantial distance from its initial position by relative adjustment of said contact members while in engagement with the work, and a support carrying the enumerated parts of the device in operative relation.

24. In combination, a gauge embodying therein a casing having an elongated yielding work engaging member mounted therein and adapted for longitudinal movement toward the work, and a second work engaging member movably mounted upon said casing for straight line movement toward or from the point of contact of said yielding work engaging member with the work, said second work engaging member having spaced portions adapted for engaging cylindrical work at transversely spaced points on the work for stably positioning the diameter of such work in alignment with the longitudinal median line of said yielding work engaging member.

25. In combination, a gauge embodying therein a casing provided with a laterally projecting extension and having an elongated yielding work engaging member mounted thereon, a rigid work engaging member slidably mounted upon said extension, means to move said last named work engaging member toward and away from said yielding work engaging member, and means yieldingly to engage the work positioned on said rigid work engaging member to clamp the surface of cylindrical work against said member.

26. A device for gauging outside cylindrical surfaces having in combination, a movable contact member, means yieldingly urging said contact member toward the work, a second contact member, means for adjusting said second contact member relatively to said movable contact member and holding said second contact member fixedly in such adjusted position, means yieldingly engaging the work for holding said second contact member against the work, and an indicating mechanism actuated by said movable contact member for indicating the distance between said contact members.

27. A device for gauging outside cylindrical surfaces having in combination, a movable contact member, means yieldingly urging said contact member toward the work, a second contact member, means for adjusting said second contact member relatively to said movable contact member and holding said second contact member fixedly in such adjusted position, means adapted for positioning the opposite ends of the diameters of the work in contact with said contact members comprising means for yieldingly forcing the work toward said second contact member and having contact with the work on points along separated parallel lines on the surface of the work.

28. A device for gauging outside cylindrical surfaces comprising in combination, an indicating device having a casing and a contact member movable relative to said casing, means responsive to relative movement of said casing and contact member for actuating said indicating device, a second contact member carried by and adjustable relative to said casing for changing the distance between said contact members, means adapted for positioning the opposite ends of the diameters of the work in contact with said contact members, said means contacting with the work on points along separated parallel lines on the surface of the work and yieldingly forcing the work toward said second contact member.

29. A device for gauging outside cylindrical surfaces having in combination, an indicating dial and pointer, a contact member mounted for axial movement, means responsive to such movement of said contact member for actuating relative movement between said dial and pointer, a spring yieldingly urging said contact member against the work, a V-block movable in a straight line relatively to said contact member for engaging the work and positioning said contact member with its axis diametrically of the work, and a common support for said parts adapted to lie at one side of the axis of the work when engaged by said V-block.

30. A device for gauging outside cylindrical surfaces having in combination, an indicating dial and a pointer, a contact member mounted for axial movement, means responsive to such movement of said contact member for actuating relative movement between said dial and pointer, means yieldingly urging said contact member in one direction, a V-block adapted for engaging the work and for stably positioning said contact member with its axis diametrically of the work, said V-block and contact member being relatively movable, and said device having means adapted for yieldingly urging said V-block toward the work.

31. A device for gauging outside cylindrical surfaces comprising in combination, an indicating dial and pointer, a contact member mounted for axial movement, means responsive to such movement for actuating relative movement between said dial and pointer, means yieldingly urging said contact member in one direction, contact-positioning-means adapted for engaging the work at points along spaced parallel lines on the work for stably positioning said contact member with its axis diametrically of the work, said contact-positioning-means and contact member being relatively movable, and said device having means adapted for yieldingly urging said contact-positioning-means toward the work.

32. A device for gauging outside cylindrical surfaces having in combination, an indicating dial and pointer, a contact member mounted for axial movement, means responsive to such movement for actuating relative movement between said dial and pointer, contact-positioning-means adapted for engaging the work at points along spaced parallel lines on the work for stably positioning said contact member with its axis diametrically of the work, and said device having means adapted for yieldingly urging said contact member and contact-positioning-means independently toward the work.

In testimony whereof, I have signed my name to this specification.

WARREN AMES.